United States Patent [19]

Amsallen

[11] Patent Number: 5,406,862
[45] Date of Patent: Apr. 18, 1995

[54] METHOD AND APPARATUS FOR SELECTING A STARTING GEAR IN AN AUTOMATED MECHANICAL TRANSMISSION

[75] Inventor: Marcel Amsallen, Kalamazoo, Mich.
[73] Assignee: Eaton Corporation, Cleveland, Ohio
[21] Appl. No.: 146,995
[22] Filed: Nov. 2, 1993
[51] Int. Cl.[6] ............................................. F16H 5/42
[52] U.S. Cl. .................................. 74/336 R; 477/900; 477/901
[58] Field of Search ......................... 74/866; 364/424.1

[56] References Cited

U.S. PATENT DOCUMENTS 5,067,374 11/1991 Sakai et al. ..................... 74/866 OR
5,172,609 12/1992 Nitz et al. ...................... 74/866 OR
5,272,939 12/1993 Markyuech et al. ........... 74/866 OR
5,289,740 3/1994 Milunas et al. ................. 74/866 OR Primary Examiner—Dirk Wright
Attorney, Agent, or Firm—Brooks & Kushman

[57] ABSTRACT

A method and apparatus for selecting a transmission starting gear based on calculated gross vehicle weight is disclosed. The vehicle speed and grade are monitored by sensors which provide data to a computer. The computer is programmed to calculate vehicle acceleration from the sensed speed and to adjust the acceleration value so as to eliminate the effect of grade. The gross vehicle weight is then calculated from the adjusted acceleration value. Based on the calculated gross vehicle weight and the existing grade, an appropriate starting gear is automatically selected by the computer from a look-up table stored in memory.

9 Claims, 4 Drawing Sheets

METHOD AND APPARATUS FOR SELECTING A STARTING GEAR IN AN AUTOMATED MECHANICAL TRANSMISSION

TECHNICAL FIELD

This invention relates to automated mechanical transmission for motor vehicles and more particularly to a method and apparatus for selecting a starting gear based on gross vehicle weight (GVW) and measured grade.

BACKGROUND ART

Medium duty trucks are often operated by drivers more accustomed to transmissions used on passenger cars. Due to inexperience, the truck driver may not always select an appropriate starting gear for the existing road and vehicle conditions. Improper selection of a starting gear can result in damage to the vehicle clutch and driveline components. While heavy duty trucks are generally driven by experienced drivers, there is still a need to provide assistance or control in the selection of the starting gear. In one prior art system a predetermined starting gear is automatically selected each time the engine is started. If the driver overrides the predetermined starting gear, the new starting gear is automatically selected each time the vehicle stops, until the engine is restarted. Relying on the previous starting gear as the default can produce problems since the previous stop may have been on a level grade and would be inappropriate if the next stop is on a 6% grade. For example, in a 16-speed transmission, 1,2,3,4 or 5 may be a correct starting gear depending upon load, grade, etc. Since it is not always best to start in the lowest gear available and the transmission can be severely damaged by starting in a gear that is inappropriately high, there is a need for a system which selects a starting gear on the basis of current operating conditions such as grade and load.

SUMMARY OF THE INVENTION

In view of the above it is an object of the present invention to provide a method and apparatus for automatically selecting a starting gear based on existing grade and gross vehicle weight.

It is another object of the present invention to provide a method and apparatus for automatically selecting a starting gear based on existing grade and gross vehicle weight wherein the gross vehicle weight is determined as a function of the acceleration of the vehicle adjusted to compensate for the grade of the vehicle at the time the acceleration was determined.

In accordance with the present invention the vehicle speed and grade are monitored by sensors which provide data to a computer. The computer is programmed to calculate vehicle acceleration from the measured speed and to determine the corresponding acceleration value if the vehicle were on a zero grade or level roadway. In other words the actual acceleration is adjusted to compensate for the effect of vehicle grade. The gross vehicle weight is then determined based on the adjusted acceleration value. Based on the determined gross vehicle weight and the existing grade, an appropriate starting gear is automatically selected by the computer from a look-up table stored in memory.

BRIEF DESCRIPTION OF THE DRAWINGS

A more complete understanding of the present invention may be had from the following detailed description which should be read in conjunction with the drawings in which.

DETAILED DESCRIPTION OF PREFERRED EMBODIMENT

Figure 1:
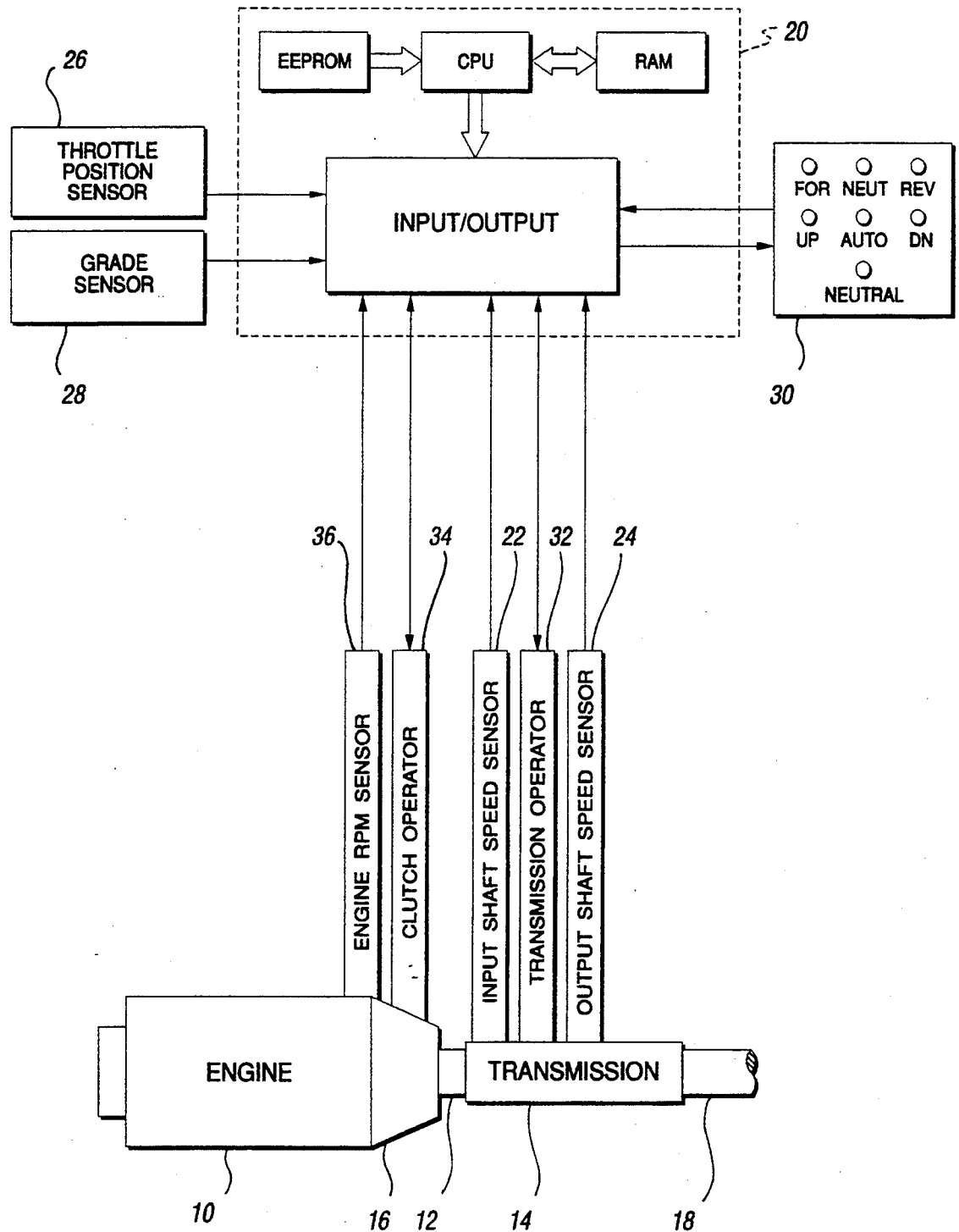
FIG. 1 is a block diagram of the apparatus of the present invention.

Referring now to the drawings and initially to FIG. 1, the vehicle engine generally designated 10 is selectively coupled to the input shaft 12 of a transmission 14 by a friction clutch mechanism 16. The transmission 14, when coupled to the engine 10 drives an output shaft 18 at a speed which is reduced relative to the speed of the input shaft 12 by the gear ratio selected. The shaft 18 is connected to a vehicle's drive wheels by a differential mechanism or the like. Transmission 14 may be a range type compound transmission such as disclosed in U.S. Pat. Nos. 3,105,395; 3,283,613 and 4,754,665, the disclosures of which are hereby incorporated by reference.

A programmable electronic control unit (ECU) generally designated 20, receives analog input data from an input shaft speed sensor 22, indicative of engine RPM when the clutch 16 is engaged, and from a transmission output shaft speed sensor 24, which is directly proportional to vehicle speed. A sensor 26 provides input to the ECU 22 proportional to throttle position, while a sensor 28, which may be an inclinometer or similar device, provides input to the ECU 22 indicative of the grade of the surface upon which the vehicle is traveling.

The ECU 20 also receives transmission gear ratio commands from a driver control console 30 and provides control signals to the console 30 for feedback to the operator. The console 30 may include indicator lamps which indicate, when energized, that the transmission is in a forward (FOR), neutral (NEUT) or reverse (REV) drive, respectively and may include manual pushbuttons which allow the operator to select an upshift (UP), automatic preselection mode (AUTO) or a downshift (DN) respectively. A pushbutton (NEUTRAL) allows selection of a shift into neutral. The ECU 20 controls a transmission operator 32 and receives feedback from the operator 32 regarding transmission status. The ECU 20 also receives engine RPM data from a speed sensor 36.

The ECU 20 includes the usual central processing unit (CPU), input/output unit (I/O), random access memory (RAM), and read only memory (ROM) which may be at least partially electrically erasable programmable read only memory (EEPROM). The ROM stores the program for controlling the transmission operator 32 to effect shifting of the transmission in response to vehicle operating conditions or commands from the console 30. The ROM also stores data in various tables for use by the CPU in making a transmission starting gear selection.

The clutch mechanism 16 includes the usual friction clutch which can be moved from a fully disengaged position to a fully engaged position by a clutch operator 34 that is controlled by signals from, and provides feedback to, the ECU 20. Alternatively, a manually actuated clutch may be employed.

Figure 2:
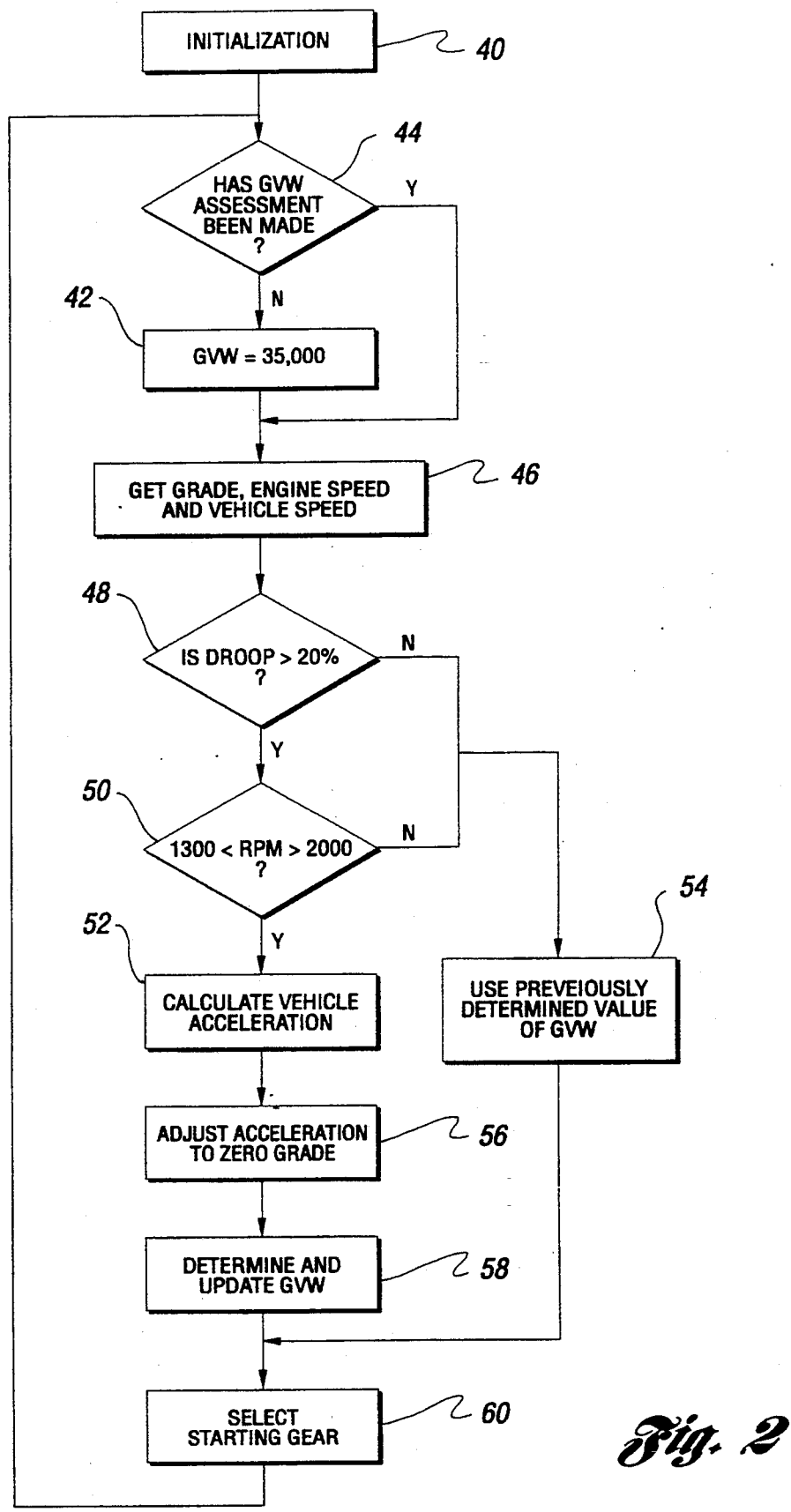
FIG. 2 is a flow chart of the computer program used in carrying out the present invention on the computer in FIG. 1.

Referring now to FIG. 2, a flow chart of the routine for controlling the selection of the transmission starting gear is shown. This routine represents the basic logical flow starting with initialization of certain variables at power up, through the process of determining the gross vehicle weight based upon grade and vehicle acceleration, to the selection of the transmission starting gear. The point in time when the grade and acceleration data is available to calculate GVW is generally not the same point in time when the actual shift is performed. This is because the conditions necessary to calculate GVW will be present only for brief periods during vehicle acceleration from rest. The grade measurement and shift point calculation procedure are therefore repeated continuously and are updated at the program loop cycle of, for example, 10 msec.

With reference to FIG. 2, GVW is initialized to 35,000 pounds at block 40 and this value is used as the default GVW value, as indicated in block 42, in any starting gear calculation until the appropriate condition are present for an actual GVW determination to be made. For example the first determination of GVW may set a flag, which flag is then checked by the decision block 44 to determine whether the default GVW should be used.

At block 46 the latest input data on the grade of the surface on which the vehicle is traveling and the engine and vehicle speed on this grade is retrieved. The starting gear selection is based on GVW which in turn is based on vehicle acceleration on a flat surface or zero grade. However, there are several other factors that can influence vehicle acceleration besides the grade and gross vehicle weight. These factors include driver operation of the throttle pedal and the characteristics of the all speed governor. For example, the driver can control vehicle acceleration by depressing the throttle pedal very slowly. The all speed governor attempts to achieve a particular engine speed for a particular throttle position and will reduce fuel flow as the engine speed approaches the speed being commanded by the current throttle position. This in turn will reduce vehicle acceleration. To insure that the vehicle acceleration is not influence by either the driver, or the all speed governor, and is a true indicator of the gross vehicle weight and grade environment, the conditions shown in decision blocks 48 and 50 are imposed and must be met before a new GVW value will be determined.

As indicated in blocks 48 and 50, if droop is greater than 20% and the engine speed is between 1300 and 2000 RPM, the acceleration of the vehicle for the existing grade is calculated at block 52 based on the vehicle speed data. Otherwise, the previously determined value of GVW is used as indicated in block 54. Droop is defined, for a given throttle position, as:

$$\% \text{ Droop} = \frac{N_0 - N_c}{N_0}$$

where:
$N_0$ = engine speed at zero load
$N_c$ = current engine speed

For a particular engine of interest, the engine speed at zero load is substantially linearly related to throttle position and consequently percent droop may be calculated on the basis of current throttle position data and engine speed data. If droop is greater than 20% the engine will be operating at full fuel or on the maximum horse power portion of the horse power versus engine speed curve. The horse power versus engine speed for a typical vehicle of interest at various throttle angular positions may be approximated by a linear equation and implemented in the ECU 20 for calculation of horse power. Alternatively, the horse power versus engine speed data at various throttle angles may be stored in look up tables in ROM if a more accurate calculation of horse power is desired.

Vehicle acceleration is the result of the horse power available from the engine in excess of that which would be required to support the current grade and GVW at zero acceleration. Since the horse power available from the engine varies with engine speed, this excess horse power, or $\Delta$ HP, will also vary with engine speed. However, the variation in $\Delta$ HP is minimal over the engine speed range of 1300 to 2000 rpm for a typical engine of interest. Thus, the condition imposed by decision blocks 48 and 50 insure that vehicle acceleration is a good indicator of gross vehicle weight and grade environment.

Figure 3:
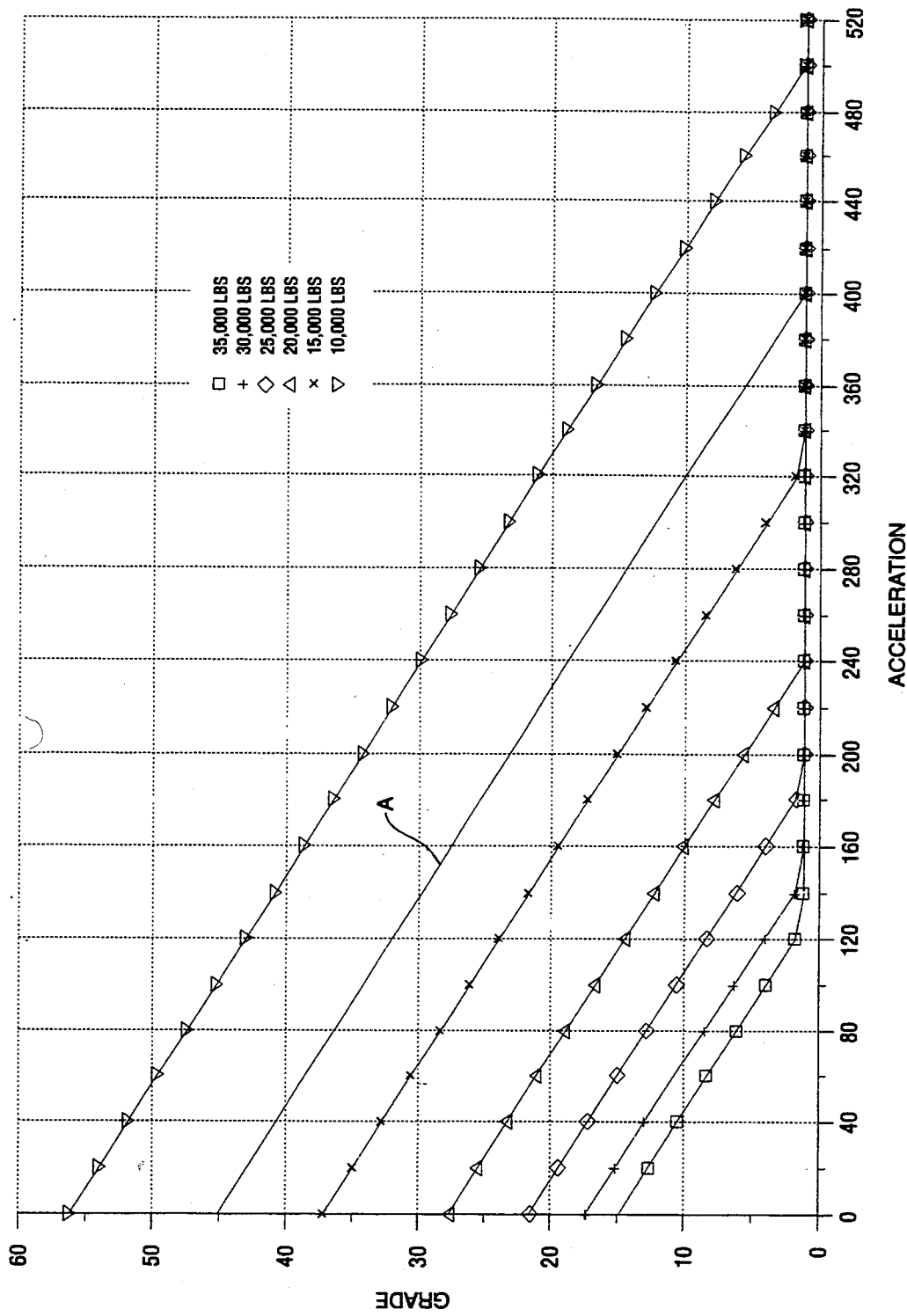
FIG. 3 is a chart of grade versus acceleration which is useful in explaining the procedure used to determine vehicle acceleration adjusted for grade.
Figure 4:
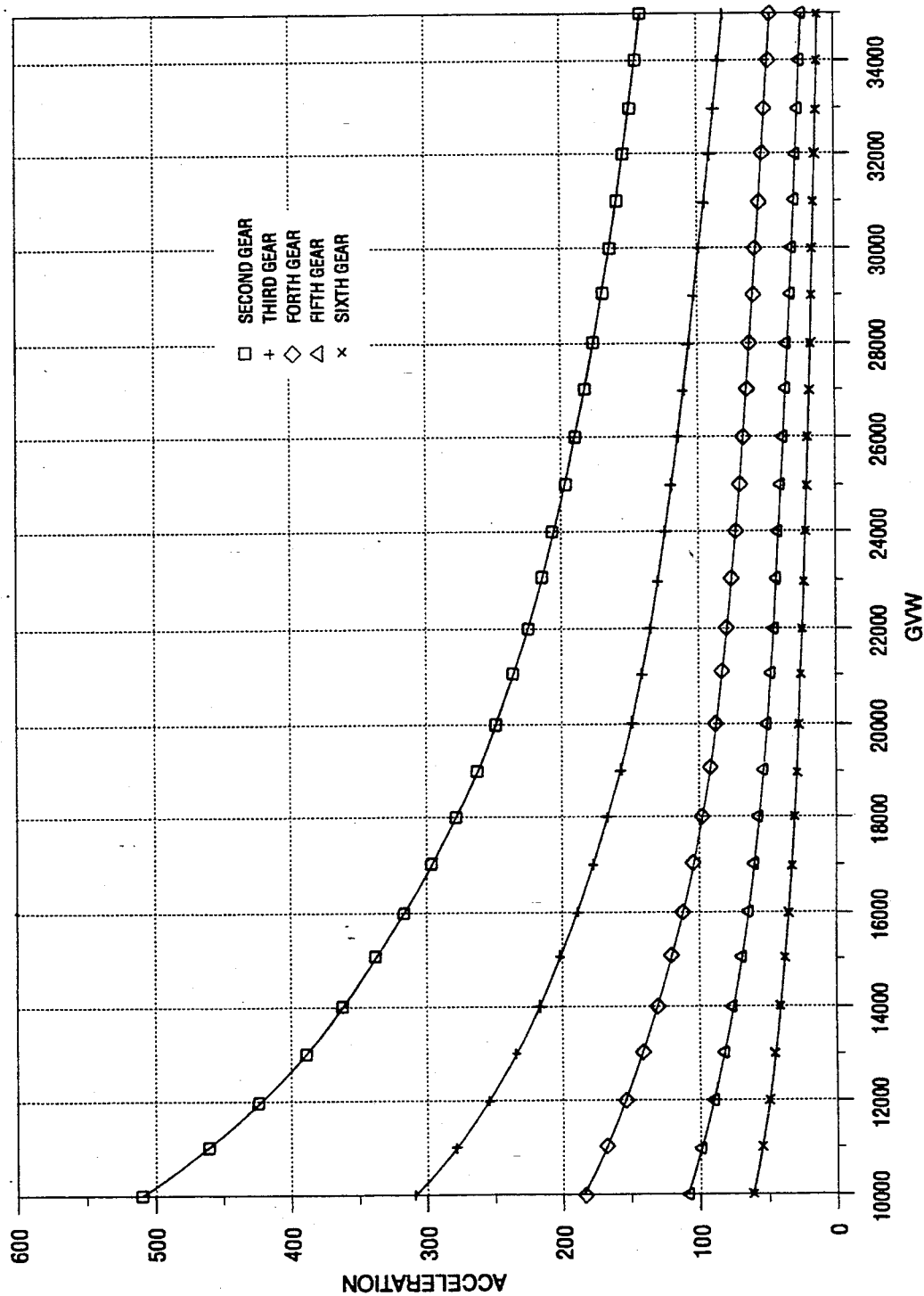
FIG. 4 is a chart of acceleration for 0% grade versus GVW for various transmission gears with the vehicle operating at a constant engine speed.

An adjustment of the value of acceleration calculated in block 52 is made in block 56 to arrive at a value of acceleration representative of a zero grade environment as opposed to the actual grade of the surface at the time of measurement. As shown in FIG. 3, the grade versus acceleration at various loads produces a family of parallel lines. The point where each line intersects the x axis represents the acceleration that this GVW would exhibit if the grade were 0%. The line A in FIG. 3 represents the GVW line which passes though the measured grade data and the calculated acceleration on that measured grade. The acceleration value where line A crosses the x axis corresponds to the acceleration at 0% for the GVW of interest and can be calculated from the following equation:

$$a_0 = s^* g + a_m$$

where:
$a_0$ = acceleration at 0% grade
s = a constant slope
g = measured grade
$a_m$ = measured acceleration FIG. 4 shows acceleration for 0% grade versus GVW in gears two through six at a constant engine speed of 1600 RPM, for a vehicle of interest. The values for the family of curves shown in FIG. 4 are stored in a table in memory so that for any calculated acceleration a corresponding value of GVW may be looked up in the table, as shown in block 58. If the calculated acceleration is not in the table, then a conventional interpolation routine is run to arrive at the GVW based on GVW entries corresponding to acceleration entries above and below the calculated acceleration. As long as engine speed is between 1300 and 2000 RPM, as required by block 50, the entries for an engine speed of 1600 RPM, do not introduce any substantial error.

Once GVW has been determined, the starting gear is then obtained from a table in ROM for the existing grade and gross vehicle weight as indicated in the block 56. Data stored in the table is shown in TABLE 1.

TABLE 1

| GVW lbs (1000 lbs) | 10 | 20 | 30 | 40 | 50 | 60 | 70 | 80 | 90 | 100 |
|---|---|---|---|---|---|---|---|---|---|---|
| GRADE | | | | | | | | | | |
| 0% | 4 | 4 | 4 | 4 | 4 | 3 | 3 | 3 | 3 | 3 |
| 1 | 4 | 4 | 4 | 4 | 4 | 3 | 3 | 3 | 3 | 3 |
| 2 | 4 | 4 | 4 | 4 | 3 | 3 | 3 | 3 | 3 | 3 |
| 3 | 4 | 4 | 4 | 3 | 3 | 3 | 3 | 3 | 2 | 2 |
| 4 | 4 | 4 | 3 | 3 | 3 | 3 | 3 | 2 | 2 | 2 |
| 5 | 4 | 3 | 3 | 3 | 3 | 3 | 2 | 2 | 2 | 1 |
| 6 | 4 | 3 | 3 | 3 | 3 | 2 | 2 | 2 | 1 | 1 |
| 7 | 3 | 3 | 3 | 2 | 2 | 2 | 2 | 1 | 1 | 1 |
| 8 | 3 | 3 | 3 | 2 | 2 | 2 | 1 | 1 | 1 | 1 |

While the best mode for carrying out the invention has been described in detail, those familiar with the art to which this invention relates will recognize various alternative designs and embodiments for practicing the invention as defined by the following claims.

What is claimed is:

1. A method of selecting a starting gear for an automated transmission of a vehicle on a grade, the method comprising:
   (a) measuring the grade while the vehicle is moving;
   (b) measuring vehicle speed;
   (c) calculating a gross vehicle weight as a function of the measured grade and vehicle speed obtained in steps a and b; and
   (d) selecting the starting gear based on the calculated gross vehicle weight and the measured grade.

2. The method defined in claim 1 wherein step c further comprises:
   (c1) calculating a vehicle acceleration based on the measured vehicle speed obtained over time from step b; and
   (c2) adjusting the acceleration calculated in step c1 to determine an acceleration which the vehicle would exhibit for the existing gross vehicle weight if the grade were 0%, based on the measured grade determined in step a.

3. The method defined in claim 2 further comprising: measuring engine speed;
calculating engine droop as a function of engine speed; and
using a previously calculated value of gross vehicle weight in selecting the starting gear unless the engine droop is greater than a predetermined value and engine speed is between predetermined upper and lower levels.

4. A method of selecting a starting gear for an automated transmission of a vehicle on a grade, the method comprising:
   (a) measuring the grade while the vehicle is moving;
   (b) determining a vehicle acceleration;
   (c) determining an acceleration, $a_0$, that the vehicle would exhibit if the grade were 0%, based on the measured grade and the acceleration determined in steps a and b;
   (d) calculating a gross vehicle weight as a function of the acceleration $a_0$ determined in step c; and
   (e) selecting the starting gear based on the calculated gross vehicle weight and the measured grade.

5. Apparatus for selecting the starting gear for an automated transmission of a vehicle on a grade, the apparatus comprising:
   means for sensing the grade,
   means for sensing vehicle speed,
   computer means programmed to calculate a gross vehicle weight based on the sensed vehicle speed and the sensed grade and to select a starting gear as a function of the calculated gross vehicle weight.

6. The invention defined in claim 5 wherein said computer means is programmed to calculate vehicle acceleration based on the sensed vehicle speed and to adjust the calculated vehicle acceleration to a zero grade environment and wherein said gross vehicle weight calculation is based on said adjusted vehicle acceleration.

7. The invention defined in claim 6 wherein said computer is programmed to use a previously calculated value of gross vehicle weight in selecting a starting gear unless engine droop is greater than a predetermined value and engine speed is between predetermined upper and lower limits.

8. The method of claim 1 wherein the grade is a zero grade.

9. The apparatus of claim 5 wherein the grade is a zero grade.

* * * * *